United States Patent
Conlon et al.

(10) Patent No.: US 12,551,462 B2
(45) Date of Patent: *Feb. 17, 2026

(54) ANTI-AGING COMPOSITION WITH RUTIN, APIGENIN, EPIGALLOCATECHIN GALLATE, LIPOIC ACID AND THE NAD PRECURSOR, NIACINAMIDE

(71) Applicant: NUCHIDO LIMITED, Tyne and Wear (GB)

(72) Inventors: Nichola Jane Conlon, Tyne and Wear (GB); Malcolm Philip Young, Tyne and Wear (GB)

(73) Assignee: NUCHIDO LIMITED (GB)

( * ) Notice: Subject to any disclaimer, the term of this patent is extended or adjusted under 35 U.S.C. 154(b) by 90 days.

This patent is subject to a terminal disclaimer.

(21) Appl. No.: 16/980,187

(22) PCT Filed: Mar. 13, 2019

(86) PCT No.: PCT/GB2019/050714
§ 371 (c)(1),
(2) Date: Sep. 11, 2020

(87) PCT Pub. No.: WO2019/175587
PCT Pub. Date: Sep. 19, 2019

(65) Prior Publication Data
US 2021/0015788 A1    Jan. 21, 2021

(30) Foreign Application Priority Data

Mar. 13, 2018 (GB) ...................... 1804020
Dec. 12, 2018 (GB) ...................... 1820233

(51) Int. Cl.
*A61K 31/352* (2006.01)
*A61K 31/05* (2006.01)
(Continued)

(52) U.S. Cl.
CPC ............ *A61K 31/352* (2013.01); *A61K 31/05* (2013.01); *A61K 31/385* (2013.01); *A61K 31/706* (2013.01)

(58) Field of Classification Search
None
See application file for complete search history.

(56) References Cited

U.S. PATENT DOCUMENTS 3,671,532 A * 6/1972 Carraz ................... A61K 31/00
514/557
5,023,245 A * 6/1991 Kuhrts ................... A61K 47/12
536/123
(Continued)

FOREIGN PATENT DOCUMENTS

CN   107308160   11/2017
WO   2008011364 A1   1/2008
(Continued)

OTHER PUBLICATIONS

Sun, C., & Zhou, J. (2008). Trichostatin A improves insulin stimulated glucose utilization and insulin signaling transduction through the repression of HDAC2. Biochemical pharmacology, 76(1), 120-127. (Year: 2008).*

(Continued)

*Primary Examiner* — Dale R Miller
(74) *Attorney, Agent, or Firm* — K&L GATES LLP (57) ABSTRACT

There is described a composition comprising an effective amount of a combination of two or more components selected from a NAD precursor; a NAMPT upregulator; a NQO1 upregulator and a NNMT (nicotinamide N-methyltransferase) downregulator.

3 Claims, 3 Drawing Sheets

NAD declines with increasing age (after Massudi et al. 2012)

(51) Int. Cl.
*A61K 31/385* (2006.01)
*A61K 31/706* (2006.01)

(56) References Cited

U.S. PATENT DOCUMENTS

| | | | | |
|---|---|---|---|---|
| 8,906,414 | B1* | 12/2014 | Shytle | A61K 9/127 |
| | | | | 424/450 |
| 10,722,529 | B2* | 7/2020 | Rappaport | A61K 39/3955 |
| 2003/0138506 | A1* | 7/2003 | Jensen | A61K 36/746 |
| | | | | 424/769 |
| 2007/0160590 | A1* | 7/2007 | McCleary | A61K 33/24 |
| | | | | 514/564 |
| 2008/0260934 | A1* | 10/2008 | Bok | A23L 13/426 |
| | | | | 426/655 |
| 2009/0312355 | A1* | 12/2009 | Bachovchin | C07D 213/55 |
| | | | | 546/276.4 |
| 2010/0215768 | A1 | 8/2010 | Pero et al. | |
| 2011/0110913 | A1* | 5/2011 | Grant | A61P 29/00 |
| | | | | 514/474 |
| 2011/0274680 | A1* | 11/2011 | Mazed | A61K 36/45 |
| | | | | 424/94.4 |
| 2017/0143752 | A1 | 5/2017 | Bernstein | |

FOREIGN PATENT DOCUMENTS

| | | |
|---|---|---|
| WO | 2009108999 A1 | 9/2009 |
| WO | 2015070280 A1 | 5/2015 |
| WO | 2017062311 A1 | 4/2017 |

OTHER PUBLICATIONS

Ryan W. Dellinger et al., "Repeat dose NRPT (nicotinamide riboside and pterostilbene) increases NAD+ levels in humans safely and sustainably: a andomized, double-blind, placebo-controlled study"; NPJ Aging and Mechanisms of Disease; Nov. 24, 2017; (9 pages).
PCT International Search Report and PCT Written Opinion for PCT International Patent Application No. PCT/GB2019/050714; (21 pages).
Ashok Jangra et al.; "Amelioration of diabetes-induced neurobehavioral and neurochemical changes by melatonin and nicotinamide: Implication of oxidative stress-PARP pathway"; Pharmacology, Biochemistry, and Behavior; (2013); pp. 43-51.

\* cited by examiner

Figure 1: NAD declines with increasing age (after Massudi et al. 2012)

Figure 2: Effect of supplementation with NCD201 on blood NAD levels

Figure 3: Comparison of blood NAD levels with a younger volunteer during supplementation with NCD201

ANTI-AGING COMPOSITION WITH RUTIN, APIGENIN, EPIGALLOCATECHIN GALLATE, LIPOIC ACID AND THE NAD PRECURSOR, NIACINAMIDE

CROSS REFERENCE TO RELATED APPLICATIONS

This is the national phase under 35 U.S.C. § 371 of International Application No. PCT/GB2019/050714, filed on Mar. 13, 2019, which claims priority to and the benefit of United Kingdom Patent Application No. 1804020.4 filed on Mar. 13, 2018 and United Kingdom Patent Application No. 1820233.3 filed on Dec. 12, 2018, the entire disclosures of each of which are incorporated by reference herein.

FIELD OF THE INVENTION

The present invention relates to novel compositions, generally for oral or topical application, for the mitigation of the effects of ageing.

More particularly, the present invention relates to novel compositions that affect the concentration of nicotinamide adenine dinucleotide (NAD), such as its precursors and ingredients that affect its metabolism, production and degradation. The invention also provides a method of mitigation of skin conditions and other effects of ageing using the novel compositions of the invention.

BACKGROUND TO THE INVENTION

NAD is a ubiquitous coenzyme, used in energy metabolism, and, we now know, a host of signalling functions. NAD titre is related to the investment a cell makes in DNA and other repair; its response to calorific restriction; and to the recruitment of senescent cells in the body. NAD concentrations drop exponentially during ageing: from about 8.5 ng/µg protein at birth, to around 1 ng/µg protein at age 60 (Massudi et al. 2012).

Recent results in vivo show that increasing NAD concentrations in aged mice induces substantial rejuvenation (Zhang et al. 2016). NAD concentrations are therefore causally involved in ageing phenotypes and recovery from them. Mitochondrial dysfunction accompanies ageing, but its causes are debated. Gomes et al, Cell 155, p 1624-1638, 2013, showed that, during ageing, there is a specific loss of mitochondrial encoded (oxidative phosphorylation) OXPHOS subunits, which Gomes attributed to an alternate PGC-1α/β-independent pathway of nuclear-mitochondrial communication that is induced by a decline in nuclear NAD+. Deleting SIRT1 (NAD-dependent deacetylase) accelerates this process, whereas raising $NAD^+$ levels in old mice restores mitochondrial function to that of a young mouse in a SIRT1-dependent manner. Gomes et al, showed that 1 week of treatment with a compound that boosts NAD+ levels is sufficient to restore mitochondrial homeostasis and key biochemical markers of muscle health in a 22-month-old mouse to levels similar to a 6-month-old mouse.

Most of the results in relation to increasing NAD concentrations; and the beneficial effects this has on ageing; have been derived from putting high concentrations of NAD precursors (such as nicotinamide mononucleotide (NMN) and nicotinamide riboside (NR)) in the diet of mice. This approach has led to several commercial products, including "Basis" from Elysium Health, which is a tablet supplement containing nicotinamide riboside (NR) (250 mg) and pterostilbene (a resveratrol analogue) (50 mg). Clinical results from subjects divided between taking this supplement, twice its dose and placebo showed increases of 40% in NAD concentrations with "Basis" and 90% increases with double its dose (Dellinger et al. 2017). However, it is unclear whether any phenotypic benefit, such as rejuvenation, could derive from this intervention.

In addition, supplementation with NAD precursors at the level that delivered substantial rejuvenation in mice would be expensive scaled up to the size of a human. Furthermore, increasing the dose of an NAD precursor in man led to a ceiling effect in the level of NAD, in which a dose of 1000 mg shows about the same NAD concentration enhancement as a dose of 300 mg (Trammell et al 2016), which may imply saturation of the enzymes responsible for transforming NAD precursors into NAD and the excretion of the surplus precursor and its metabolites. Moreover, other examples of supplementation with a precursor, such as L-DOPA for conditions in which dopamine is reduced, evidence fairly rapid re-establishment of physiological equilibrium in such a way that the efficacy of the precursor supplementation diminishes over time.

SUMMARY TO THE INVENTION

We have now found novel compositions comprising any combination of a NAD precursor, a NAMPT upregulator, a NQO1 upregulator and a NNMT downregulator can have a beneficial effect on NAD concentrations in mammals.

Thus, according to a first aspect of the invention there is provided a composition comprising an effective amount of a combination of two or more components selected from a NAD precursor; a NAMPT upregulator; a NQO1 upregulator and a NNMT (nicotinamide N-methyltransferase) downregulator.

The two or more components in the composition of the invention are functional components, that is they have an effect on NAD concentrations. It is within the scope of the present invention that when any of these functional components is present, e.g. a NAD precursor; a NAMPT upregulator; a NQO1 upregulator and/or a NNMT (nicotinamide N-methyltransferase) downregulator; any one or more of the active components may comprise more than one active agents.

The combination of the NAD precursor; NAMPT upregulator; and NQO1 upregulator can be administered together in a single composition or administered separately in two or more different compositions, e.g., compositions or dosage forms. The administration of the NAD precursor; NAMPT upregulator; and NQO1 upregulator can be in any order.

According to this aspect of the invention the composition may comprise a combination of a NAD precursor and a NAMPT upregulator; or a combination of a NAD precursor and a NQO1 upregulator; or a combination of a NAMPT upregulator and a NQO1 upregulator; or a combination of a NAMPT upregulator and a NNMT downregulator. It will be understood that the composition of the invention may comprise an effective amount of a NAD precursor; a NAMPT upregulator; and a NQO1 upregulator. In the composition of the invention each of the NAD precursor; the NAMPT upregulator; the NQO1 upregulator; and the NNMT downregulator; may optionally include more than one effective component.

The composition of the invention as herein described may, in addition, include one or more of a NADase downregulator, an upregulator of NMNATs 1-3 (nicotinamide mononucleotide adenylyltransferase), a Cx43 (connexin 43) inhibitor, a CD73 upregulator, a CD157 downregulator, a 5'

AMP-activated protein kinase (AMPK) upregulator, a NR kinase1/2 (NRK1/2) upregulator, a NARPT upregulator, a quinolinate phosphoribosyl transferase (QPRT) upregulator, a NAD synthase 1 (NADSyn1) upregulator, a miRNA-34a downregulator and a purine nucleoside phosphorylase (PNP) upregulator; and any combination thereof.

According to a further aspect of the invention there is provided a composition as herein described which includes a NADase downregulator.

According to a further aspect of the invention there is provided a composition as herein described which includes an upregulator of NMNATs 1-3 (nicotinamide mononucleotide adenylyltransferase).

According to a yet further aspect of the invention there is provided a composition as herein described which includes a Cx43 (connexin 43) inhibitor.

CD73 acts to transport NR into the cell where it is converted to NAD (Grozio et al. 2013). According to a further aspect of the invention there is provided a composition as herein described which includes a CD73 upregulator.

CD157 is a homolog of CD38 and also a NADase. According to a further aspect of the invention there is provided a composition as herein described which includes a CD157 downregulator.

AMPK plays a post-translational role in NAMPT protein abundance. The AMPK activator AICAR increased NAMPT (Brandauer et al. 2013). Glucose restriction has been shown to activate AMPK which induces transcription of NAMPT (Fulco et al. 2008). According to a further aspect of the invention there is provided a composition as herein described which includes a 5' AMP-activated protein kinase (AMPK) upregulator.

According to a further aspect of the invention there is provided a composition as herein described which includes a NR kinase1/2 (NRK1/2) upregulator.

NARPT is an enzyme that converts NA to NAMN. According to a further aspect of the invention there is provided a composition as herein described which includes a NARPT upregulator.

QPRT is an enzyme that converts quinolinic acid to Nicotinic acid mononucleotide (NAMN). According to a further aspect of the invention there is provided a composition as herein described which includes a quinolinate phosphoribosyl transferase (QPRT) upregulator.

NADSyn1 is an enzyme that converts NAAD to NAD. According to a further aspect of the invention there is provided a composition as herein described which includes a NAD synthase 1 (NADSyn1) upregulator. miRNA-34a inhibits the activity of NAMPT (Choi et al. 2013). According to a further aspect of the invention there is provided a composition as herein described which includes a miRNA-34a downregulator.

PNP is an enzyme that converts NR to NAM. According to a further aspect of the invention there is provided a composition as herein described which includes a purine nucleoside phosphorylase (PNP) upregulator.

It will generally be understood that the term "downregulator" shall mean an inhibitor or suppressor; and the term "upregulator" shall mean an activator or promoter.

CD73 upregulators according to the present invention are selected from one or more of acacetin, alprostadil, anisomycin, apigenin, chrysin, dinoprost, luteolin, menadione, myricetin, quercetin, rutin and trichostatin A; and derivatives thereof; and any combination thereof.

5' AMP-activated protein kinase (AMPK) upregulators according to the present invention are selected from one or more of resveratrol, dinitrophenol, quercetin, EMIQ isoquercitrin, rutin, berberine, alpha-lipoic acid, curcumin, genistein, ginsenoside RE, (−)-epigallocatechin gallate (EGCG), salicylate, astragalus, apigenin, myricetin, kaempferol and luteolin; and derivatives thereof; and any combination thereof.

NR kinase1/2 (NRK1/2) upregulators according to the present invention are selected from one or more of retinoic acid, tricostatin A and resveratrol; and derivatives thereof; and any combination thereof.

NAD synthase 1 (NADSyn1) upregulators according to the present invention are selected from one or more of vitamin D3 and nadide; and derivatives thereof; and any combination thereof.

miRNA-34a downregulators according to the present invention includes lithium; and derivatives thereof.

Purine nucleoside phosphorylase (PNP) upregulators according to the present invention are selected from one or more of quercetin, (−)-epigallocatechin gallate, tricostatin A, rutin, resveratrol and coumestrol; and derivatives thereof; and any combination thereof.

The composition will generally include an acceptable excipient.

NAD precursors are known in the art; and NAD precursors according to the present invention are selected from one or more of niacin (vitamin $B_3$), tryptophan, quinolinic acid, nicotinic acid mononucleotide (NaMN), nicotinamide riboside (NR), nicotinic acid adenine dinucleotide (NaAD), nicotinamide (NAM), 1-methylnicotinamide (MNA), and nicotinamide mononucleotide (NMN); and derivatives thereof; and any combination thereof.

In another aspect of the invention the NAD precursor is any combination of any two or more of niacin (vitamin $B_3$), tryptophan, quinolinic acid, nicotinic acid mononucleotide (NaMN), nicotinamide riboside (NR), nicotinic acid adenine dinucleotide (NaAD), nicotinamide (NAM), 1-methylnicotinamide (MNA), and nicotinamide mononucleotide (NMN); and derivatives thereof.

The amount of NAD precursor in the composition may vary depending upon the nature of the NAD precursor, the mode of administration, etc. Exemplary amounts of NAD precursor which may be in the composition are from about 10 mg to about 1000 mg per day; or from about 50 mg to about 900 mg; or from about 100 mg to about 800 mg; or from about 150 mg to about 700 mg; or from about 200 mg to about 600 mg; or from about 250 mg to about 500 mg.

An NAMPT upregulator is an agent that acts to increase the expression of nicotinamide phosphoribosyltransferase. NAMPT upregulators according to the present invention are selected from one or more of phenylephrine, trichostatin A, quercetin (including derivatives of quercetin, such as, 3, 5, 7, 3', 4'-pentahydroxyflavon, EMIQ isoquercitrin, quercetin 3-O-glucoside, quercetin 3-O-rhamnoside; quercetin 3-O-rhamnozyl-(1→6)-glucoside (rutin); quercetin-3-O-beta-D-glucuronide and 3-methyl quercetin), retinoic acid, pokeweed mitogen, cis-resveratrol, trans-resveratrol, melatonin, troxrutin, b-hydroxy-beta-methyl-butyrate, leucine, apigenin, curcumin, myricetin, genistein, (−)-epigallocatechin-3-gallate, kaempferol, luteolin, fisetin, ellagic acid and catechol; and derivatives thereof; and any combination thereof.

In another aspect of the invention the NAMPT upregulator is a combination comprising at least two of phenylephrine, trichostatin A, quercetin (including derivatives of quercetin, such as, 3, 5, 7, 3', 4'-pentahydroxyflavon, EMIQ isoquercitrin, quercetin 3-O-glucoside, quercetin 3-O-rhamnoside; quercetin 3-O-rhamnozyl-(1→6)-glucoside (rutin); quercetin-3-O-beta-D-glucuronide and 3-methyl quercetin), retinoic acid, pokeweed mitogen, cis-resveratrol, trans-resveratrol, melatonin, troxrutin, b-hydroxy-beta-methyl-butyrate, leucine, apigenin, curcumin, myricetin, genistein, (−)-epigallocatechin-3-gallate, kaempferol, luteolin, fisetin, ellagic acid and catechol; and derivatives thereof.

In this aspect of the invention the NAMPT upregulator is a combination comprising trichostatin A and quercetin.

In another aspect of the invention the NAMPT upregulator is a combination comprising trichostatin A and phenylephrine.

In another aspect of the invention the NAMPT upregulator is a combination comprising trichostatin A and retinoic acid.

In another aspect of the invention the NAMPT upregulator is a combination comprising trichostatin A and pokeweed mitogen.

In another aspect of the invention the NAMPT upregulator is a combination comprising quercetin and phenylephrine.

In another aspect of the invention the NAMPT upregulator is a combination comprising quercetin and retinoic acid.

In another aspect of the invention the NAMPT upregulator is a combination comprising quercetin and pokeweed mitogen.

In another aspect of the invention the NAMPT upregulator is a combination comprising phenylephrine and retinoic acid.

In another aspect of the invention the NAMPT upregulator is a combination comprising phenylephrine and pokeweed mitogen.

In another aspect of the invention the NAMPT upregulator is a combination comprising retinoic acid and pokeweed mitogen.

In another aspect of the invention the NAMPT upregulator is a combination comprising rutin and apigenin.

In another aspect of the invention the NAMPT upregulator is a combination comprising rutin and (−)-epigallocatechin-3-gallate.

In another aspect of the invention the NAMPT upregulator is a combination comprising quercetin and (−)-epigallocatechin-3-gallate.

In another aspect of the invention the NAMPT upregulator is a combination comprising isoquercitrin and (−)-epigallocatechin-3-gallate.

The amount of NAMPT upregulator in the composition may vary depending upon the nature of the NAMPT upregulator, the mode of administration, etc. Exemplary amounts of NAMPT upregulator which may be in the composition is from about 10 mg to about 1000 mg per day; or from about 50 mg to about 900 mg per day; or from about 100 mg to about 800 mg per day; or from about 150 mg to about 700 mg per day; or from about 200 mg to about 600 mg per day; or from about 250 mg to about 500 mg per day.

An NQO1 upregulator is an agent that acts to increase expression of the NQO1 gene. The NQO1 gene encodes the enzyme NAD(P)H dehydrogenase [quinone]1. NAD(P)H dehydrogenase [quinone]1 is an oxidoreductase that acts on NADH (the reduced form of nicotinamide adenine dinucleotide) and NADPH (nicotinamide adenine dinucleotide phosphate or the reduced form of NADP$^+$). NQO1 upregulators according to the present invention are selected from one or more of melatonin; trichostatin A, curcumin, retinoic acid, kaempferol, wortmannin, (−)-epigallocatechin gallate, beta-lapachone, hydroquinone, genistein, methyl salicylate, resveratrol, alpha-lipolic acid, 18 alpha glycyrrhetinic acid, apigenin, myricetin, luteolin, rutin, ellagic acid, catechol and quercetin (including derivatives of quercetin); and derivatives thereof; and any combination thereof.

In another aspect of the invention the NQO1 upregulator is a combination comprising at least two of melatonin, trichostatin A, curcumin, retinoic acid, kaempferol, wortmannin, (−)-epigallocatechin gallate, beta-lapachone, hydroquinone, genistein, methyl salicylate, resveratrol, alpha-lipolic acid, 18 alpha glycyrrhetinic acid, apigenin, myricetin, luteolin, rutin, ellagic acid, catechol and quercetin (including derivatives of quercetin); and derivatives thereof.

In this aspect of the invention the NQO1 upregulator is a combination comprising melatonin and curcumin.

In another aspect of the invention the NQO1 upregulator is a combination comprising melatonin and trichostatin A.

In another aspect of the invention the NQO1 upregulator is a combination comprising melatonin and retinoic acid.

In another aspect of the invention the NQO1 upregulator is a combination comprising melatonin and quercetin.

In another aspect of the invention the NQO1 upregulator is a combination comprising curcumin and trichostatin A.

In another aspect of the invention the NQO1 upregulator is a combination comprising curcumin and retinoic acid.

In another aspect of the invention the NQO1 upregulator is a combination comprising curcumin and quercetin.

In another aspect of the invention the NQO1 upregulator is a combination comprising trichostatin A and retinoic acid.

In another aspect of the invention the NQO1 upregulator is a combination comprising trichostatin A and quercetin.

In another aspect of the invention the NQO1 upregulator is a combination comprising retinoic acid and quercetin.

In another aspect of the invention the NQO1 upregulator is a combination comprising rutin and (−)-epigallocatechin-3-gallate.

In another aspect of the invention the NQO1 upregulator is a combination comprising quercetin and (−)-epigallocatechin-3-gallate.

In another aspect of the invention the NQO1 upregulator is a combination comprising isoquercitrin and (−)-epigallocatechin-3-gallate.

In another aspect of the invention the NQO1 upregulator is a combination comprising alpha lipoic acid and (−)-epigallocatechin-3-gallate.

In another aspect of the invention the NQO1 upregulator is a combination comprising alpha lipoic acid and rutin.

In another aspect of the invention the NQO1 upregulator is a combination comprising alpha lipoic acid and quercetin.

In another aspect of the invention the NQO1 upregulator is a combination comprising alpha lipoic acid and isoquercitrin.

The amount of NQO1 upregulator in the composition may vary depending upon the nature of the NQO1 upregulator, the mode of administration, etc. Exemplary amounts of NQO1 upregulator which may be in the composition is from about 10 mg to about 1000 mg per day; or from about 50 mg to about 900 mg per day; or from about 100 mg to about 800 mg per day; or from about 150 mg to about 700 mg per day; or from about 200 mg to about 600 mg per day; or from about 250 mg to about 500 mg per day.

NNMT downregulators according to the present invention are selected from one or more of tricostatin A, withaferin A, catechin, (−)-epigallocatechin gallate, Green Tea Leaf Extract containing EGCG, ellagic acid, and derivatives thereof; and any combination thereof.

NMNATs 1-3 upregulators according to the present invention include tricostatin A.

Cx43 inhibitors according to the present invention are selected from one or more of 18-beta-glycyrrhizic acid, glycyrrhizin, glabridin, ACT1 peptide, resveratrol, 15-delta prostaglandin J2 and puromycin; and derivatives thereof; and any combination thereof.

As herein described the composition of the invention may comprise a NADase downregulator. More specifically, a NADase downregulator may be a downregulator of CD38, PARP1 (Poly [ADP-ribose]polymerase 1) and/or SIRTs (NAD-dependent deacetylase sirtuins). CD38 is also known as cyclic ADP ribose hydrolase. It is a glycoprotein found on the surface of many cells. When the composition of the invention includes a NADase downregulator, the NADase downregulator according to the present invention are selected from one or more of quercetin, apigenin, luteolinidin, rutin, luteolin, kuromanin, curcumin, myricetin, genistein, (−)-epigallocatechin-3-gallate, kaempferol and luteolin; and derivatives thereof; and any combination thereof.

In another aspect of the invention the NADase downregulator is a combination comprising quercetin, apigenin, luteolinidin, luteolin, rutin, kuromanin, curcumin, myricetin, genistein, (−)-epigallocatechin-3-gallate, kaempferol and luteolin; and derivatives thereof; and any combination thereof.

The amount of NADase downregulator in the composition may vary depending upon the nature of the NADase downregulator, the mode of administration, etc. Exemplary amounts of NADase downregulator which may be in the composition are from about 10 mg to about 1000 mg per day; or from about 50 mg to about 900 mg per day; or from about 100 mg to about 800 mg per day; or from about 150 mg to about 700 mg per day; or from about 200 mg to about 600 mg per day; or from about 250 mg to about 500 mg per day.

When the composition of the invention includes a Cx43 inhibitor, such as, 18bGA (18b-glycyrrhetinic acid), the source of the 18bGA may comprise liquorice or liquorice root or an extract thereof.

One specific composition which may be mentioned comprises an effective amount of a combination of niacin, NR, quercetin, trichostatin A, curcumin, melatonin and apigenin.

Another specific composition which may be mentioned comprises an effective amount of a combination of one or more NAMPT upregulators; one or more NAD precursors; one or more AMPK upregulators; and optionally one or more NNMT, downregulators. According to this aspect of the invention the composition may comprise an effective amount of a combination of apigenin, rutin, niacinamide, alpha lipoic acid and EGCG.

According to this aspect of the invention the composition may comprise one or more NAMPT upregulators (from about 41 to about 133 parts w/w); one or more NAD precursors (from about 20 to about 60 parts w/w); and one or more AMPK upregulators (from about 12 to about 36 parts w/w). In another aspect of the invention the composition may comprise one or more NAMPT upregulators (from about 63 to about 111 parts w/w, e.g. 87 parts w/w); one or more NAD precursors (from about 30 to about 50 parts w/w, e.g. 40 parts w/w); and one or more AMPK upregulators (from about 18 to about 30 parts w/w, e.g. 24 parts w/w).

Another specific composition which may be mentioned comprises resveratrol, quercetin/rutin, alpha lipoic acid and apigenin.

Another specific composition which may be mentioned comprises resveratrol, quercetin/rutin and EGCG.

The compositions of the invention may also include one or more bioavailability enhancers or skin penetration enhancers. Such bioavailability enhancers or skin penetration enhancers shall include, but shall not be limited to, DMSO, decyl methyl sulfoxide, N-dodecyl pyrrolidone, decanol, dodecanol, an organic acid such as oleic acid, zinc, vitamin C and piperine (Bioperine®) or the like; and combinations thereof. In one aspect of the invention the bioavailability enhancers or skin penetration enhancers include zinc, vitamin C and piperine (Bioperine®); and combinations thereof.

According to a yet further aspect of the invention there is provided a composition comprising an effective amount of a combination of two or more components selected from a NAD precursor; a NAMPT upregulator; and a NQO1 upregulator; for use in the mitigation, alleviation or improvement of the effects of ageing.

According to a further aspect of the invention there is provided a composition as herein described wherein the composition includes a NADase downregulator; for use in the mitigation, alleviation or improvement of the effects of ageing.

According to this aspect of the invention there is provided a composition as herein described for use in the mitigation, alleviation or improvement of the effects of ageing as herein described.

The effects of ageing may include age-related skin conditions, skin conditions related to sun exposure, skin conditions related to pollution exposure, skin conditions related to oxidative stress, and skin conditions related to lifestyle choices, such as diet, alcohol and/or smoking. In addition, the compositions of the invention may be advantageous in the mitigation, alleviation or improvement of skin conditions related to inflammatory skin disorders and skin conditions related autoimmune disease skin disorders. The compositions of the invention may be advantageous in the mitigation, alleviation or improvement of other age-related conditions, such as, but not limited to, increased frailty, loss of resilience, loss of muscle strength, loss of muscle endurance, loss of energy, loss of cognitive sharpness, loss of memory, etc. More specifically, the compositions of the invention may be advantageous in the mitigation, alleviation or improvement of other age-related conditions, such as, but not limited to, atherosclerosis and cardiovascular disease, cancer, arthritis, cataracts, osteoporosis, type 2 diabetes, hypertension and Alzheimer's disease; the incidence of which increases with aging.

Age-related skin conditions that may be mitigated, alleviated or improved, shall include, but shall not be limited to, one or more of sagging, wrinkles, skin elasticity, skin ageing, skin moisture, wounds, acne, skin darkening, skin whitening, pigmentation, age-spots, loss of radiance, puffiness, uneven skin tone, redness, rosacea, loss of barrier function, loss of skin resilience, loss of firmness, stretchmarks, cellulite and dryness.

Skin conditions related to sun exposure that may be mitigated, alleviated or improved, include, but shall not be limited to, one or more of actinic keratoses, freckles, lentigines or age spots, moles, photosensitivity, polymorphous light eruption, seborrheic keratoses, skin cancer (such as melanoma, squamous cell carcinoma, basal cell carcinoma), solar elastosis or wrinkles and sun burn.

Skin conditions related to inflammatory skin disorders that may be mitigated, alleviated or improved, include, but shall not limited to, one or more of acne, asteatotic eczema, atopic dermatitis, contact dermatitis, discoid eczema, eczematous drug eruptions, erythema multiforme, erythroderma, gravitational/varicose eczema, hand eczema, keratosis lichenoides chronica, lichen nitidus, lichen planus, lichen simplex, lichen striatus, mycosis fungoides, pityriasis lichenoides, psoriasis, seborrheic dermatitis, Stevens-Johnson Syndrome, toxic epidermal necrolysis and vasculitis.

Skin conditions related autoimmune disease skin disorders that may be mitigated, alleviated or improved, include, but shall not limited to, one or more of alopecia areata, bullous pemphigoid, dermatomyositis, dystrophic epidermolysis bullosa, eosinophilic fasciitis, pemphigus vulgaris, psoriasis, pyoderma gangrenosum, scleroderma, systemic lupus erythematosus and vitiligo.

According to further aspect of the invention there is provided a composition as herein described for use in the mitigation, alleviation or improvement of the effects of an autoimmune disorder.

Such autoimmune disorders and related immune disorders shall include, but shall not be limited to, systemic lupus erythematosus (SLE), rheumatoid arthritis, non-glomerular nephrosis, psoriasis, chronic active hepatitis, ulcerative colitis, Crohn's disease, Behcet's disease, chronic glomerulonephritis, chronic thrombocytopenic purpura, and autoimmune haemolytic anaemia.

The composition of the present invention may be administered topically, orally or parenterally; or may comprise controlled, modified or extended release formulations comprising suitable mitigation amounts of the desired active components in the form of powders, granules, sterile parenteral solutions or suspensions, oral solutions or suspensions, oil water emulsions as well as implants and microencapsulated delivery systems.

Parenteral Administration

Thus, according to one aspect of the invention there is provided the composition as herein described for parenteral administration.

When the composition of the invention is administered parenterally, it may be in the form of an intramuscular, intravenous, subcutaneous, intraperitoneal, local or transdermal bolus injection or continuous infusion.

Topical Administration

Preferably, the composition of the invention may be administered topically or transdermally. Thus, according to this aspect of the invention there is provided the composition as herein described for topical administration. According to a further aspect of the invention there is provided the composition as herein described for transdermal administration.

Suitable formulations for topical or transdermal application include an effective amount of the composition of the invention comprise the active components as herein defined with one or more carriers. Carriers include absorbable pharmacologically acceptable solvents to assist passage into the skin of the host.

Suitable formulations for topical application, e.g., to the skin and eyes, include aqueous solutions, suspensions, ointments, creams, gels, sprayable formulations, transdermal patch or bandage e.g., for delivery by aerosol or the like. Such topical delivery systems will in particular be appropriate for dermal application, for prophylactic use in sun creams, lotions; sprays and the like. They are thus particularly suited for use in topical, including cosmetic, formulations well-known in the art. Such formulations may contain solubilisers, stabilizers, tonicity enhancing agents, buffers and preservatives.

Transdermal devices may be in the form of a bandage comprising a backing member, a reservoir containing the composition of the invention optionally with carriers, optionally a rate controlling barrier to deliver the composition of the invention to the skin of the host at a controlled and predetermined rate over a prolonged period of time, and means to secure the device to the skin of the host at a controlled and predetermined rate over a prolonged period of time, and means to secure the device to the skin.

Oral Administration

Thus, according to one aspect of the invention there is provided the composition as herein described for oral administration.

When the composition of the invention is administered orally, it may be in the form of tablets or capsules.

The compositions of the invention can be made up in a solid form including capsules, tablets, pills, granules, powders, food bar or confectionery; or in a liquid form including solutions, suspensions or emulsions or in the form of a syrup, linctus, elixir, a liquid beverage, such as a yoghurt drink, or a foodstuff, such as a yoghurt.

The compositions can be subjected to conventional operations such as sterilization and/or can contain conventional inert diluents, lubricating agents, or buffering agents, as well as adjuvants, such as preservatives, stabilizers, wetting agents, emulsifiers and buffers etc.

Typically, when the compositions are in the form of tablets or capsules, e.g. gelatin capsules, the compositions may comprise the active components, i.e. a combination of two or more components selected from a NAD precursor; a NAMPT upregulator; and a NQO1 upregulator;
together with
a) diluents, e.g., lactose, dextrose, sucrose, mannitol, sorbitol, cellulose and/or glycine;
b) lubricants, e.g., silica, talcum, stearic acid, its magnesium or calcium salt and/or polyethyleneglycol; for tablets also;
c) binders, e.g., magnesium aluminium silicate, starch paste, gelatin, tragacanth, methylcellulose, sodium carboxymethylcellulose and/or polyvinylpyrrolidone; if desired;
d) disintegrants, e.g., starches, agar, alginic acid or its sodium salt, or effervescent mixtures; and/or
e) absorbents, colourants, flavours and sweeteners.

Tablets may be either film coated or enteric coated according to methods known in the art.

Suitable compositions for oral administration include an effective amount of the active components described herein in the form of tablets, lozenges, aqueous or oily suspensions, dispersible powders or granules, food bar, confectionery, solution, emulsion, hard or soft capsules, a syrup, linctus, elixir, a liquid beverage or a foodstuff.

Compositions intended for oral use can be prepared according to any method known in the art for the manufacture of effective compositions; and such compositions can contain one or more additional agents selected from the group consisting of sweetening agents, flavouring agents, colouring agents and preserving agents in order to provide elegant and palatable preparations.

Tablets contain the composition comprising the active components herein described, in admixture with non-toxic orally acceptable excipients which are suitable for the manufacture of tablets. These excipients are, for example, inert diluents, such as calcium carbonate, sodium carbonate, lactose, calcium phosphate or sodium phosphate; granulating and disintegrating agents, for example, corn starch, or alginic acid; binding agents, for example, starch, gelatin or acacia; and lubricating agents, for example magnesium stearate, stearic acid or talc. The tablets may be uncoated or coated by known techniques to delay disintegration and absorption in the gastrointestinal tract and thereby provide a sustained action over a longer period. For example, a time delay material such as glyceryl monostearate or glyceryl distearate can be employed.

Formulations for oral use can be presented as hard gelatin capsules wherein the composition comprising the active components is mixed with an inert solid diluent, for example, calcium carbonate, calcium phosphate or kaolin, or as soft gelatin capsules wherein the composition comprising the active components is mixed with water or an oil medium, for example, peanut oil, liquid paraffin or olive oil.

The soft capsule can be prepared using techniques well known in the art. For example, soft capsules are typically produced using a rotary die encapsulation process. Active agent formulations are fed into the encapsulation machine by gravity. In an embodiment, the formulation comprises pharmaceutical excipients such as olive oil, gelatin, glycerin, purified water, beeswax yellow, sunflower lecithin, silicon dioxide, titanium dioxide, F. D. & C Blue 1 and F. D. & C Red 4, microcrystalline cellulose, hypromellose, vegetable magnesium stearate, and/or silica.

A capsule shell can comprise one or more plasticizers such as glycerin, sorbitol, sorbitans, maltitol, glycerol, polyethylene glycol, polyalcohols with 3 to 6 carbon atoms, citric acid, citric acid esters, triethyl citrate and combinations thereof. In an embodiment, the plasticizer is glycerin.

In addition to the plasticizer(s), the capsule shell can include other suitable shell additives such as opacifiers, colourants, humectants, preservatives, flavourings, and buffering salts and acids.

Opacifiers are used to opacify the capsule shell when the encapsulated active agents are light sensitive. Suitable opacifiers, include, but not limited to, titanium dioxide, zinc oxide, calcium carbonate and combinations thereof. In an embodiment, the opacifier is titanium dioxide.

Colourants can be used to for marketing and product identification and/or differentiation purposes. Suitable colourants include synthetic and natural dyes and combinations thereof.

Humectants can be used to suppress the water activity of the softgel. Suitable humectants include glycerin and sorbitol, which are often components of the plasticizer composition. Due to the low water activity of dried, properly stored softgels, the greatest risk from microorganisms comes from molds and yeasts. For this reason, preservatives can be incorporated into the capsule shell. Suitable preservatives include alkyl esters of p-hydroxy benzoic acid such as methyl, ethyl, propyl, butyl and heptyl (collectively known as "parabens") or combinations thereof.

According to a further aspect of the invention there is provided a method of mitigation, alleviation or improvement of the effects of ageing in a host, said method comprising the administration of an effective amount of a composition comprising a combination of two or more components selected from a NAD precursor; a NAMPT upregulator; and a NQO1 upregulator; each as herein described.

According to this aspect of the invention the method of mitigation, alleviation or improvement of the effects of ageing may comprise the administration of an effective amount of a composition comprising a combination of a NAD precursor and a NAMPT upregulator; or a combination of a NAD precursor and a NQO1 upregulator; or a combination of a NAMPT upregulator and a NQO1 upregulator; or a combination of a NAMPT upregulator and a NNMT downregulator. It will be understood that the composition of the invention may comprise an effective amount of a NAD precursor; a NAMPT upregulator; and a NQO1 upregulator. In the composition of the invention each of the NAD precursor; the NAMPT upregulator; and the NQO1 upregulator; may optionally include more than one effective component.

According to a further aspect of the invention the method comprises the administration of an effective amount of a composition as herein described wherein the composition includes a NADase downregulator.

The method according to this aspect of the invention may comprise the mitigation, alleviation or improvement of age related skin conditions, skin conditions related to sun exposure, skin conditions related to pollution exposure, skin conditions related to oxidative stress, and skin conditions related to lifestyle choices, such as diet, alcohol and/or smoking. In addition, the method of the invention may be advantageous in the mitigation, alleviation or improvement of skin conditions related to inflammatory skin disorders and skin conditions related autoimmune disease skin disorders.

Current NAD enhancement can comprise intermittent NAD IV infusion, administration of an oral NAD precursor, as herein described, or a combination of both NAD IV infusion and NAD precursor.

However, whilst NAD IV infusions will enhance NAD by an external method that does not use the NAD generating processes intrinsic to cells, such infusions will also inhibit the natural cellular production of endogenous NAD, due to negative feedback inhibition of the enzymes responsible for transforming NAD precursors into NAD and/or the excretion of the surplus precursor. This risks lower endogenous NAD production during and after the NAD IV infusion.

Compositions of the present invention may also be used alongside NAD IV infusions to counteract this negative feedback effect by maintaining optimal enzyme ratios/enzyme activity in the cell, thus counteracting the possible negative impact of the infusion.

In the same way, supplementation alone with NAD and/or an NAD precursor may also saturate the enzymes, thus reducing the cells ability to synthesise NAD, resulting in poor in vivo conversion of the endogenous and exogenous NAD precursors.

Compositions of the present invention prevent this enzyme saturation and allow the cell to maximally utilise the NAD precursors for greater and more efficient conversion to NAD.

Compositions of the present invention will also downregulate the NNMT enzyme. NNMT methylates the NAD precursor NAM and this methylated NAM is then excreted from the body. Consequently, the excreted NAM is unavailable to be converted back into NAD via the salvage pathway. Therefore, downregulation of NNMT will maintain higher net in vivo NAD because more NAM is available to enter salvage pathway to be converted back to NAD.

Compositions of the present invention are advantageous in that they rebalance endogenous NAD-related enzymes toward NAD production; and away from NAD catabolism and/or NAD excretion; thus generating higher NAD levels. Even with direct NAD IV infusion or NAD precursor supplementation, failing to prevent NAD catabolism and/or NAD excretion will result in much lower NAD enhancement than could otherwise be achieved.

Therefore, compositions of the present invention may also be used during NAD IV infusion and/or NAD precursor supplementation to ensure that the endogenous production of NAD is not inhibited and to ensure that cells are primed to be able to maximally convert exogenous and endogenous NAD precursor into NAD.

Thus, according to this aspect of the invention there is provided a method of mitigation, alleviation or improvement of the effects of ageing in a host, said method comprising the enhancement of endogenous and exogenous NAD and/or NAD precursors by the administration of an effective amount of a composition as herein described.

The enhancement of endogenous and exogenous NAD and/or NAD precursors as herein described would prevent catabolism and excretion of NAD and/or NAD precursors.

The method according to this aspect of the invention may comprise the administration of an effective amount of a composition of the invention in isolation, i.e. as the sole source of endogenous NAD or NAD precursor, or as an adjunct therapy accompanying NAD IV infusion and/or administration of an oral NAD precursor.

Selection of a particular effective dose can be determined (e.g., via clinical trials) by a person skilled in the art based upon the consideration of several factors which will be known to the person skilled in the art, such as, the skin disorder to be mitigated, alleviated or improved; the nature and severity of the skin disorder being treated, the body mass of the host; and the like. The precise dose employed in the mitigation, alleviation or improvement of the skin disorder may also depend upon the route of administration. Effective doses can be extrapolated from dose-response curves derived from in vitro or animal model test systems.

However, in general, satisfactory results may be obtained at a daily dosage of the composition of the invention of from about 0.1 to about 500 mg/kg body weight; or from about 1 to about 400 mg/kg; or from about 1 to about 300 mg/kg; or from about 1 to about 200 mg/kg; or from about 1 to about 100 mg/kg; or from about 10 to about 50 mg/kg; administered, for example, in divided doses up to three or four times a day, e.g. twice daily, or in sustained release form.

It is often practical to administer the daily dose of the composition of the invention at various hours of the day. The amount of the active composition administered may depend on such factors as the solubility of the active composition, the formulation used, subject condition (such as weight), and/or the route of administration.

The present invention will now be described by way of example only and with reference to the accompanying figures, in which.

EXPERIMENTAL

NAD Enhancement

Figure 1:
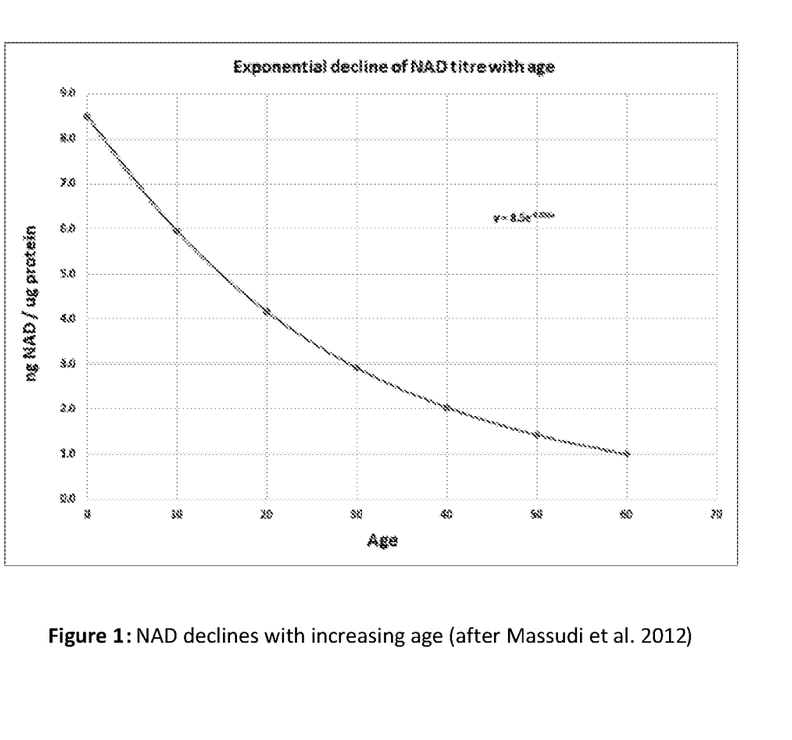
FIG. 1 illustrates NAD decline with increasing age (after Massudi et al. 2017)

NAD is found in every cell in the body and plays a vital role in energy metabolism. It is also an important signalling molecule controlling, among many other processes, cells' investment in DNA repair. NAD levels decline exponentially throughout life. For example, humans at birth show an average of 8.5 ng NAD/µg of protein which declines to 1 ng NAD/µg of protein or less by age 60 (FIG. 1). Breakthrough research in 2016 demonstrated that restoring NAD to youthful concentrations was sufficient to induce striking rejuvenation in mice. DNA repair also declines in accord with the decline of NAD through life (Li et al. 2017), and this is sufficient to explain much of the exponentially increasing risk of disease and frailty with ageing.

This remarkable rejuvenation in mice was accomplished by gross NAD-precursor supplementation in the diet. NAD-precursors are utilised by cellular NAD synthesis pathways to increase production of NAD. However, precursor supplementation alone is unlikely to deliver substantial long-term benefits in man, because suitable NAD-precursors are expensive when scaled to human bodyweight; whilst increasing input to a biological system may result in enhanced output in the short-term, in the longer-term is likely to result in a readjustment of the system to a new equilibrium, resulting in a decline in efficacy; and there is evidence of saturation of key enzymes that generate NAD from its precursors in such a way that increasing supplementation of the precursor above a certain dose does not give greater enhancement of NAD titres.

To address these issues, we took a different approach, based on a designed "cocktail" with some precursor supplementation alongside multiple interventions on the enzymes involved in generating and destroying NAD. The aim was not only to increase input to the system, but also to increase and maintain the activity of the biological machinery that synthesises and metabolises NAD. The cocktail (NCD201) was suitable for oral ingestion, and we contracted with a university laboratory to undertake an initial clinical trial of its effect in one 57-year-old male.

NAD levels were measured in blood samples withdrawn by venepuncture as the principal measure of effect. The design of the study was to establish blood baseline NAD values which were then measured again repeatedly during a week of exposure to the NCD201 cocktail. A period of washout (no NCD201 for one week) then occurred, and NAD values were measured again during a further week of exposure to a slightly modified cocktail.

Figure 2:
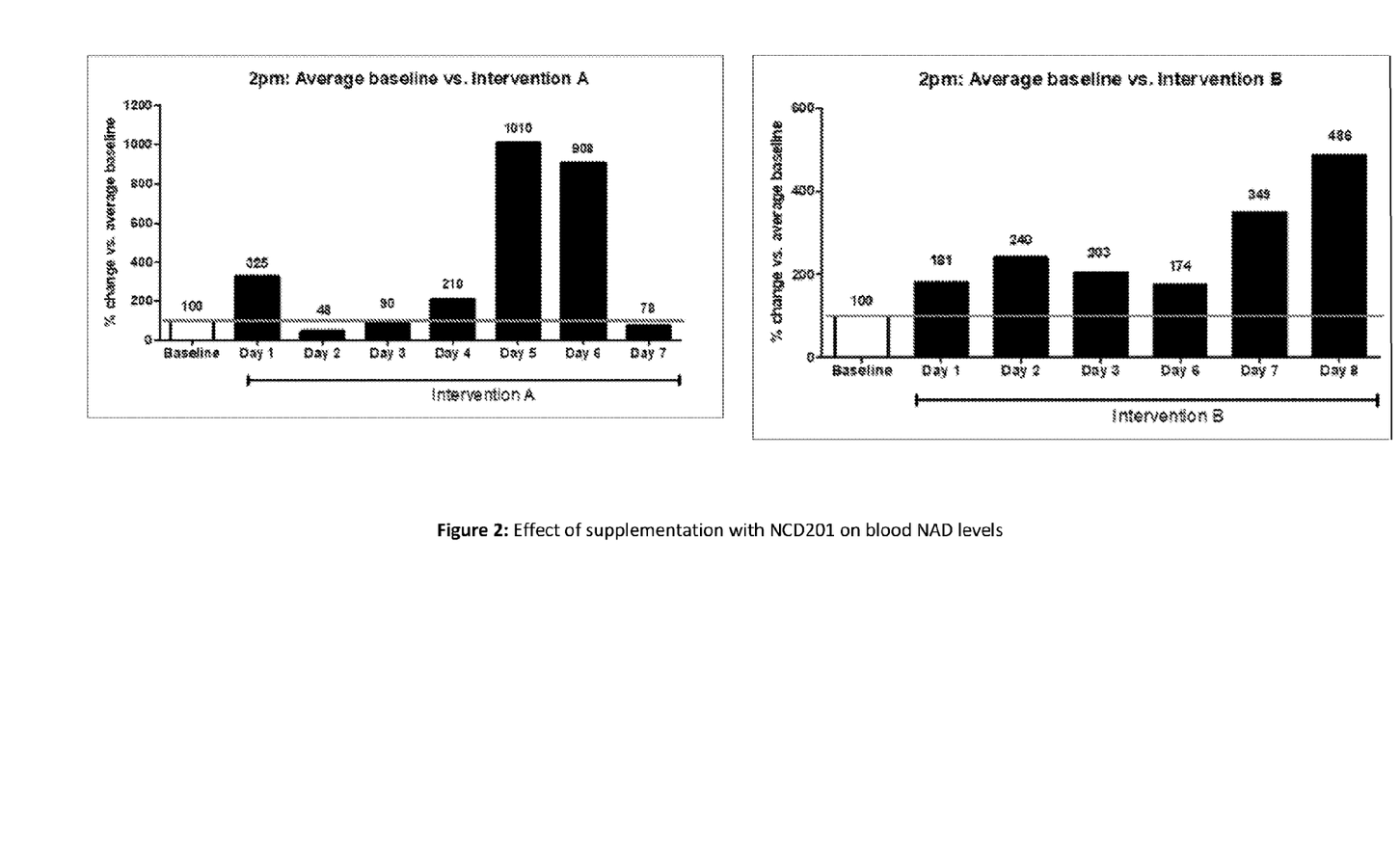
FIG. 2 illustrates the effect of supplementation with NCD201 on blood NAD levels.

The results were that NAD levels across the two weeks under treatment with NCD201 were raised on average 331% above the subject's baseline (381% week 1, 272% week 2) (FIG. 2). The peak enhancement was 1,010% on Day 5, a value that corresponded to 4.27 ng NAD/g protein, or an 'NAD biomarker age' of 19 on that day, while the average enhancement across both treatment weeks corresponded to a reduction in biomarker age of more than 20 years.

These experimental enhancements of NAD levels by NCD201 are much larger than for any other approach so far reported in man. Elysium Health's commercially available "Basis" supplement (nicotinamide riboside and pterostilbene), for example, showed an enhancement in NAD concentration of 192% (as % baseline) (Dellinger et al. 2017), and Trammell et al. 2016 showed a 270% enhancement (as % baseline) with Niagen (NR).

Figure 3:
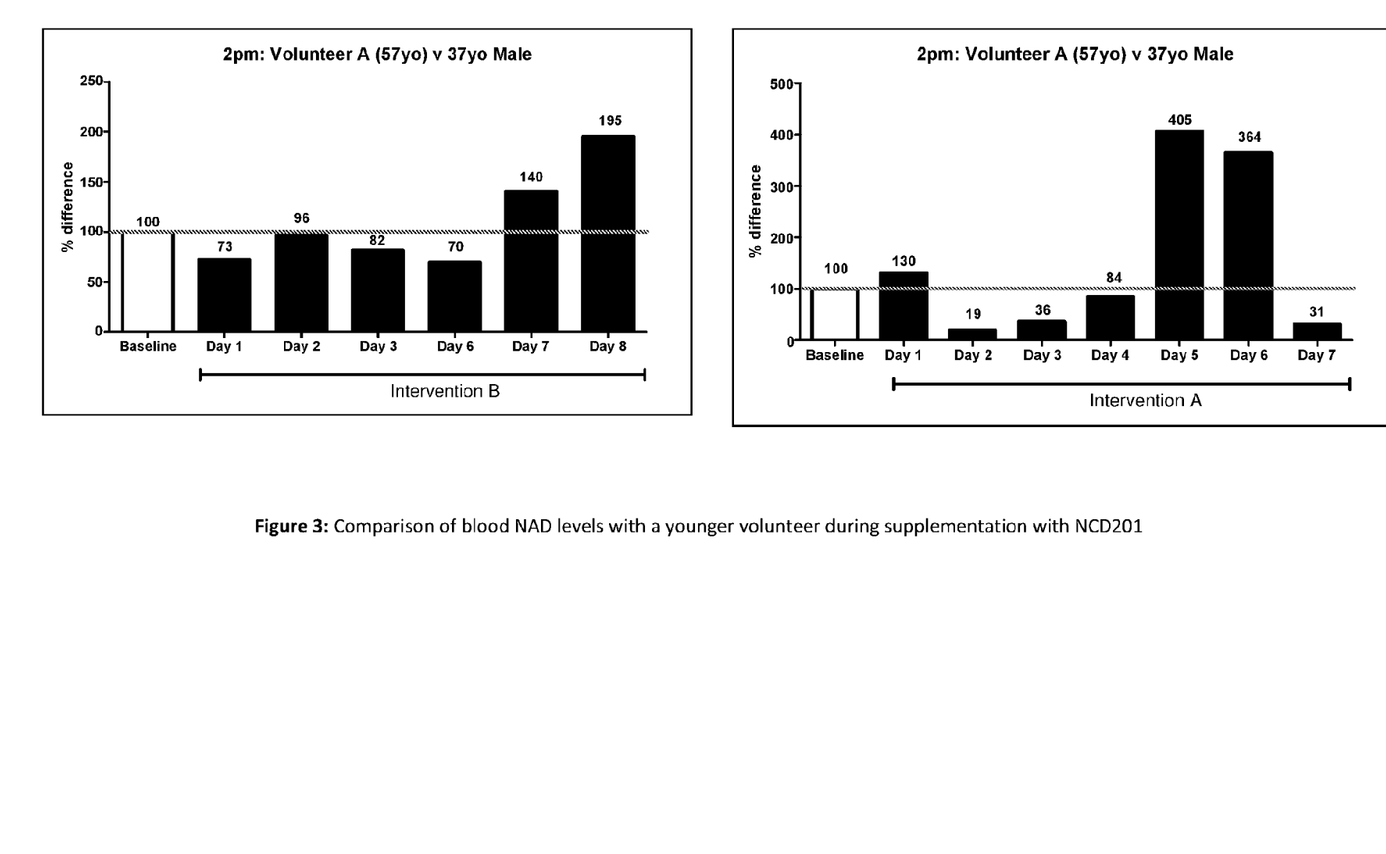
FIG. 3 is a comparison of blood NAD levels with a younger volunteer during supplementation with NCD201.

The efficacy of NCD201 was further informed by comparison with baseline data for a healthy male volunteer in his mid-30s. These comparisons show that the treated NAD levels were on average across the two treatment weeks 133% of those of the volunteer in his 30s (153% week 1, 109% week 2) (FIG. 3), corresponding, from this different baseline, to a biomarker age of 28 years for the 57-year-old subject. In the words of one of the university collaborators "the 57-year-old volunteer's treatment takes him significantly higher than a seemingly healthy 30-something male".

On the basis of these results, and to the best of our knowledge, NCD201 is superior by a substantial margin to every other approach to NAD promotion in man.

NAD Trial Protocol

Measurement of NAD

NAD was measured in peripheral blood mononuclear cells before and after administration of the intervention to one male subject. In brief, blood was extracted via venepuncture and PBMCs were isolated using density gradient separation. NAD was measured in the PBMC fraction using the NAD⁺/NADH-Glo assay kit (Promega). NAD measurements were adjusted for protein concentration using a standard BCA assay.

Establishment of Baseline NAD

Cellular NAD concentrations within the body display diurnal variation. To accurately measure changes in NAD, these natural fluctuations in baseline NAD must be considered. Prior to administration of the intervention, baseline NAD fluctuations were investigated by obtaining blood samples from the subject over a period of 12 hours (8a.m. to 8p.m.) at a frequency of every 2 hours. This was repeated on 3 separate days and NAD was measured as described above. This data was used to inform a suitable timepoint for NAD measurement during the intervention. This was decided to be 2 μm, a timepoint where NAD was consistently low.

Intervention Ingredients and Dosage

The intervention comprised a proprietary cocktail (NCD201), which was comprised by resveratrol, quercetin, alpha lipoic acid, apigenin, and nicotinamide riboside.

Cocktail NCD201 comprised the following components:

| Component | Required dose |
| --- | --- |
| Nicotinamide Riboside | 1,000 mg |
| Quercetin | 1,125 mg |
|  | 12.5 mg/kg |
| Resveratrol | 450 mg |
|  | 5 mg/kg |
| Alpha-lipoic acid | 600 mg |
| Apigenin | 600 mg |

Dosing Regimen

The intervention was administered orally at 8:30 am (overnight fasted) for 7 consecutive days. A blood sample was obtained each day at 2 μm during the intervention and NAD was measured as described above.

After the intervention, a period of washout was then observed for 7 consecutive days during which no intervention was administered. At the end of the washout period, NAD was measured to check if it had returned to baseline levels. Upon confirmation that baseline levels of NAD were re-established, the intervention was then administered for a further 7 days and NAD measurements repeated.

The invention claimed is:

1. A composition consisting of an effective amount of, from 100 mg to 800 mg niacinamide, from 50 mg to 900 mg rutin, from 100 mg to 800 mg alpha lipoic acid, from 50 mg to 900 mg epigallocatechin gallate (EGCG), from 10 mg to 1,000 mg apigenin and optionally one or more carriers or excipients, wherein said carriers or excipients are selected from the group consisting of solvents, solubilizers, stabilizers, tonicity enhancing agents, buffers, preservatives, diluents, lubricating agents, wetting agents, emulsifiers, plasticizers, opacifiers, humectants, disintegrants, absorbents, colourants, flavours and sweeteners.

2. A composition according to claim 1 consisting of an effective amount of, from 150 mg to 600 mg niacinamide, from 150 mg to 700 mg rutin, from 150 mg to 700 mg alpha lipoic acid, from 50 mg to 600 mg EGCG, from 10 mg to 1,000 mg apigenin and optionally one or more carriers or excipients, wherein said carriers or excipients are selected from the group consisting of solvents, solubilizers, stabilizers, tonicity enhancing agents, buffers, preservatives, diluents, lubricating agents, wetting agents, emulsifiers, plasticizers, opacifiers, humectants, disintegrants, absorbents, colourants, flavours and sweeteners.

3. A composition according to claim 1 consisting of an effective amount of, from 200 mg to 600 mg niacinamide, from 150 mg to 700 mg rutin, from 150 mg to 700 mg alpha lipoic acid, from 100 mg to 800 mg EGCG, from 10 mg to 1,000 mg apigenin and optionally one or more carriers or excipients, wherein said carriers or excipients are selected from the group consisting of solvents, solubilizers, stabilizers, tonicity enhancing agents, buffers, preservatives, diluents, lubricating agents, wetting agents, emulsifiers, plasticizers, opacifiers, humectants, disintegrants, absorbents, colourants, flavours and sweeteners.

* * * * *